(12) United States Patent
Critchley et al.

(10) Patent No.: US 10,598,530 B2
(45) Date of Patent: *Mar. 24, 2020

(54) FLOW SENSOR WITH HOT FILM ANEMOMETER

(71) Applicant: A. O. SMITH CORPORATION, Milwaukee, WI (US)

(72) Inventors: Matthew W. Critchley, Milwaukee, WI (US); Charles J. Koehler, III, Wauwatosa, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,813

(22) Filed: Feb. 19, 2019

(65) Prior Publication Data

US 2019/0178692 A1     Jun. 13, 2019

Related U.S. Application Data

(63) Continuation of application No. 15/466,517, filed on Mar. 22, 2017, now Pat. No. 10,274,353.

(51) Int. Cl.
| | |
|---|---|
| *G01F 1/684* | (2006.01) |
| *G01F 1/692* | (2006.01) |
| *G01F 1/696* | (2006.01) |
| *G01F 15/18* | (2006.01) |

(52) U.S. Cl.
CPC .............. *G01F 1/684* (2013.01); *G01F 1/692* (2013.01); *G01F 1/696* (2013.01); *G01F 15/18* (2013.01); *G01F 15/185* (2013.01)

(58) Field of Classification Search
None
See application file for complete search history.

(56) References Cited

U.S. PATENT DOCUMENTS

| | | | | |
|---|---|---|---|---|
| 4,024,761 | A * | 5/1977 | Djorup | G01P 5/10 73/204.15 |
| 4,418,568 | A * | 12/1983 | Surman | G01F 1/684 73/114.33 |
| 4,449,401 | A * | 5/1984 | Kaiser | G01F 1/684 73/202.5 |
| 4,594,889 | A | 6/1986 | McCarthy | |
| 4,596,140 | A | 6/1986 | Dorman et al. | |
| 5,201,221 | A | 4/1993 | Forgacs et al. | |
| 5,231,878 | A | 8/1993 | Zanini-Fisher et al. | |
| 6,655,207 | B1 | 12/2003 | Speldrich et al. | |
| 10,274,353 | B2 * | 4/2019 | Critchley | G01F 1/684 |
| 2008/0087102 | A1 * | 4/2008 | Snell | B82Y 15/00 73/861.85 |

(Continued)

*Primary Examiner* — Andre J Allen
(74) *Attorney, Agent, or Firm* — Michael Best & Friedrich LLP

(57) ABSTRACT

A method for determining flow velocity in a flow path, comprises defining a flow path for a fluid, the fluid flowing in a downstream direction that is opposite an upstream direction. A thermally-conductive element is exposed to the flow path. A known amount of heat is applied to a first portion of the thermally-conductive element and a sensed temperature is sensed at a second portion of the thermally-conductive element downstream of the first portion. The known amount of heat and the sensed temperature are used to determine a flow velocity of the fluid in the flow path.

11 Claims, 6 Drawing Sheets

(56) References Cited

U.S. PATENT DOCUMENTS

| | | |
|---|---|---|
| 2010/0031742 A1 | 2/2010 | Muziol et al. |
| 2010/0154532 A1 | 6/2010 | Becke et al. |
| 2013/0125644 A1* | 5/2013 | Pernod ................. G01F 1/6845 73/204.27 |
| 2015/0192442 A1 | 7/2015 | Olin |
| 2015/0192444 A1 | 7/2015 | Olin |
| 2015/0253169 A1* | 9/2015 | Najafi ...................... G01F 1/69 73/204.14 |
| 2015/0285666 A1 | 10/2015 | Knittel et al. |
| 2015/0292929 A1 | 10/2015 | Knittel et al. |
| 2016/0216292 A1* | 7/2016 | Potash .................... G01P 5/12 |
| 2018/0161531 A1 | 6/2018 | Costella et al. |

\* cited by examiner

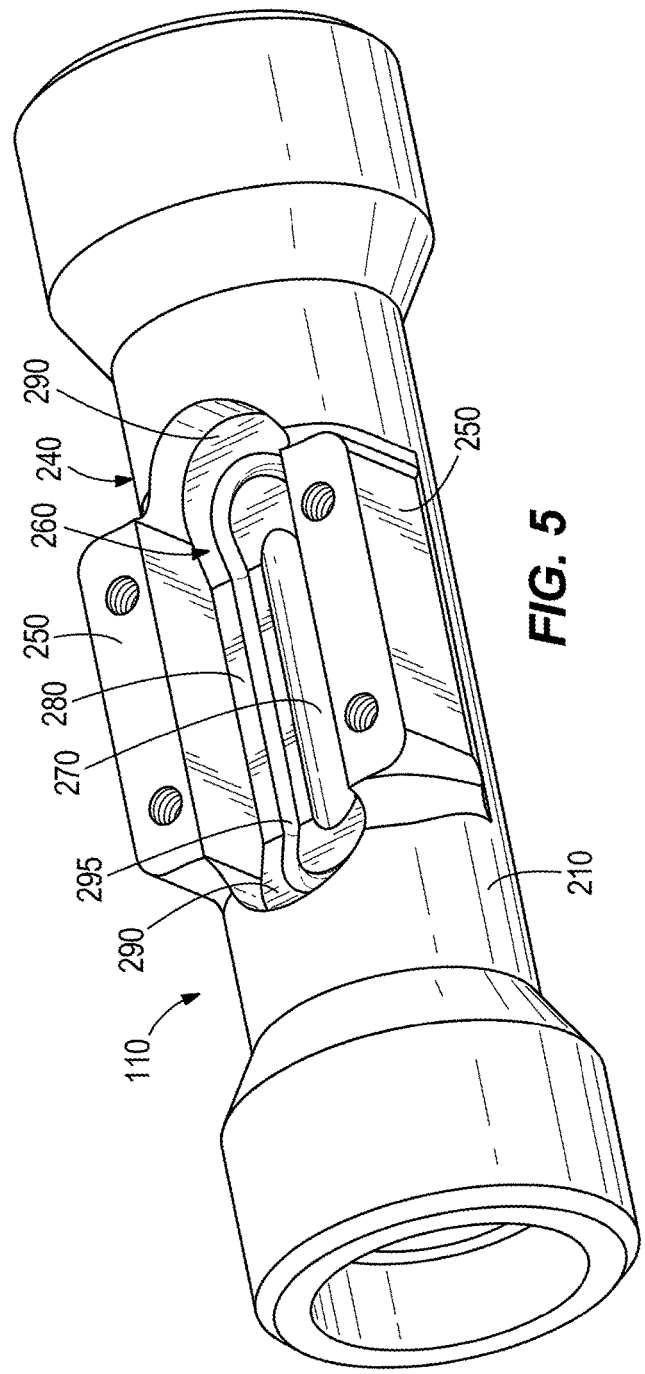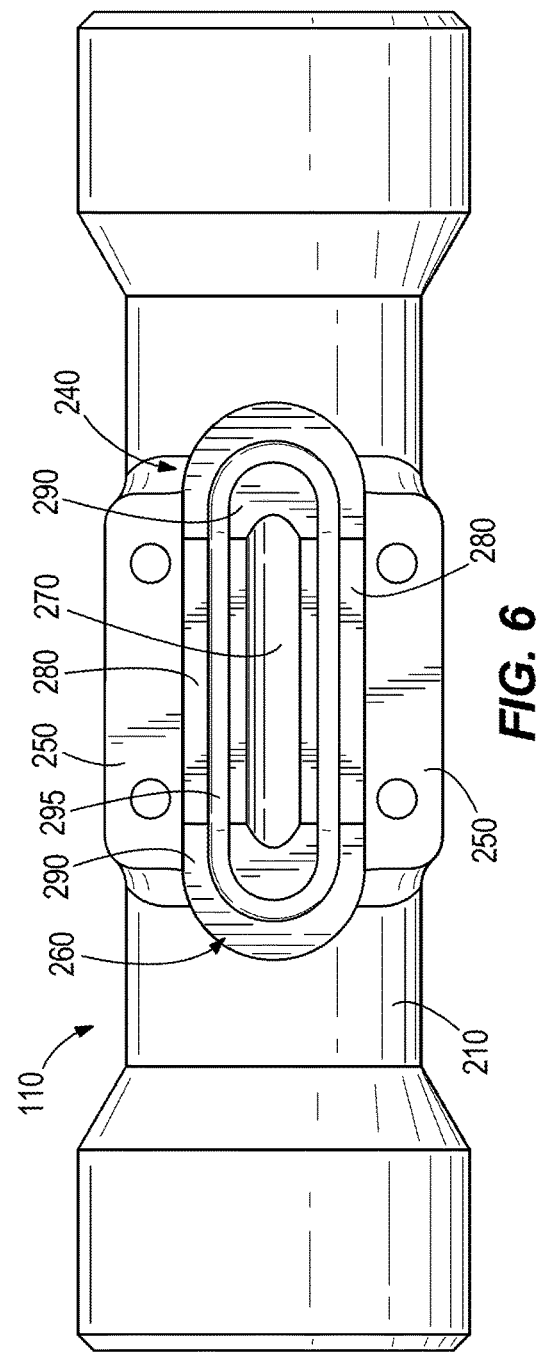

FLOW SENSOR WITH HOT FILM ANEMOMETER

CROSS-REFERENCE TO RELATED APPLICATIONS

This application is a continuation of U.S. patent application Ser. No. 15/466,517 filed Mar. 22, 2017.

BACKGROUND

The present invention relates to a flow sensor, and more particularly to a flow sensor including a tube and separately-formed base that is installable in a window in the tube and connectable to a hot film anemometer sensor.

SUMMARY

In one aspect, the invention provides a method for determining flow velocity in a flow path, comprising: defining a flow path for a fluid, the fluid flowing in a downstream direction that is opposite an upstream direction; exposing a thermally-conductive element to the flow path; applying a known amount of heat to a first portion of the thermally-conductive element; sensing a sensed temperature of a second portion of the thermally-conductive element downstream of the first portion; and determining a flow velocity of the fluid in the flow path based on the known amount of heat and the sensed temperature.

In another aspect, defining a flow path for a fluid comprises providing a tube having a tube wall surrounding the flow path and having a longitudinal axis extending in the downstream direction. In another aspect, exposing a thermally-conductive element to the flow path comprises defining a window in the tube wall and positioning the thermally-conductive element in the window with a side of the thermally-conductive element facing the flow path. In another aspect, positioning the thermally-conductive element in the window includes recessing the thermally-conductive element in the tube wall. In another aspect, the invention further comprises sealing the thermally-conductive element in the window to prevent fluid in the flow path from leaking out of the window. In another aspect, exposing a thermally-conductive element includes providing a piece of thermally-conductive material having a thickness no greater than 0.004 inch and exposing a first surface of the piece of thermally-conductive material to the flow path. In another aspect, exposing a thermally-conductive element includes providing a piece of thermally-conductive material having a first surface facing toward the fluid flowing in a downstream direction and a second surface facing away from the fluid flowing in a downstream direction; applying a known amount of heat includes applying the known amount of heat to the second surface; and sensing a sensed temperature includes sensing a temperature of the second surface. In another aspect, sensing a sensed temperature further includes mounting a temperature sensor to a sensor-mounting section of the second surface for sensing the temperature of the second surface. In another aspect, providing a piece of thermally-conductive material includes making the first and second surfaces of the thermally-conductive element planar and parallel to each other in the sensor-mounting section. In another aspect, applying a known amount of heat and sensing a sensed temperature, and determining a flow velocity are all done under the control of the controller. In another aspect, the invention further comprises providing a hot film anemometer flow sensor having a heater and a temperature sensor; wherein applying a known amount of heat is performed with the heater; and sensing a sensed temperature is performed with the temperature sensor.

Other aspects of the invention will become apparent by consideration of the detailed description and accompanying drawings.

BRIEF DESCRIPTION OF THE DRAWINGS

FIG. 5 is a perspective view of a tube of the flow sensor.

FIG. 6 is a side view of the tube.

DETAILED DESCRIPTION

Figure 1:
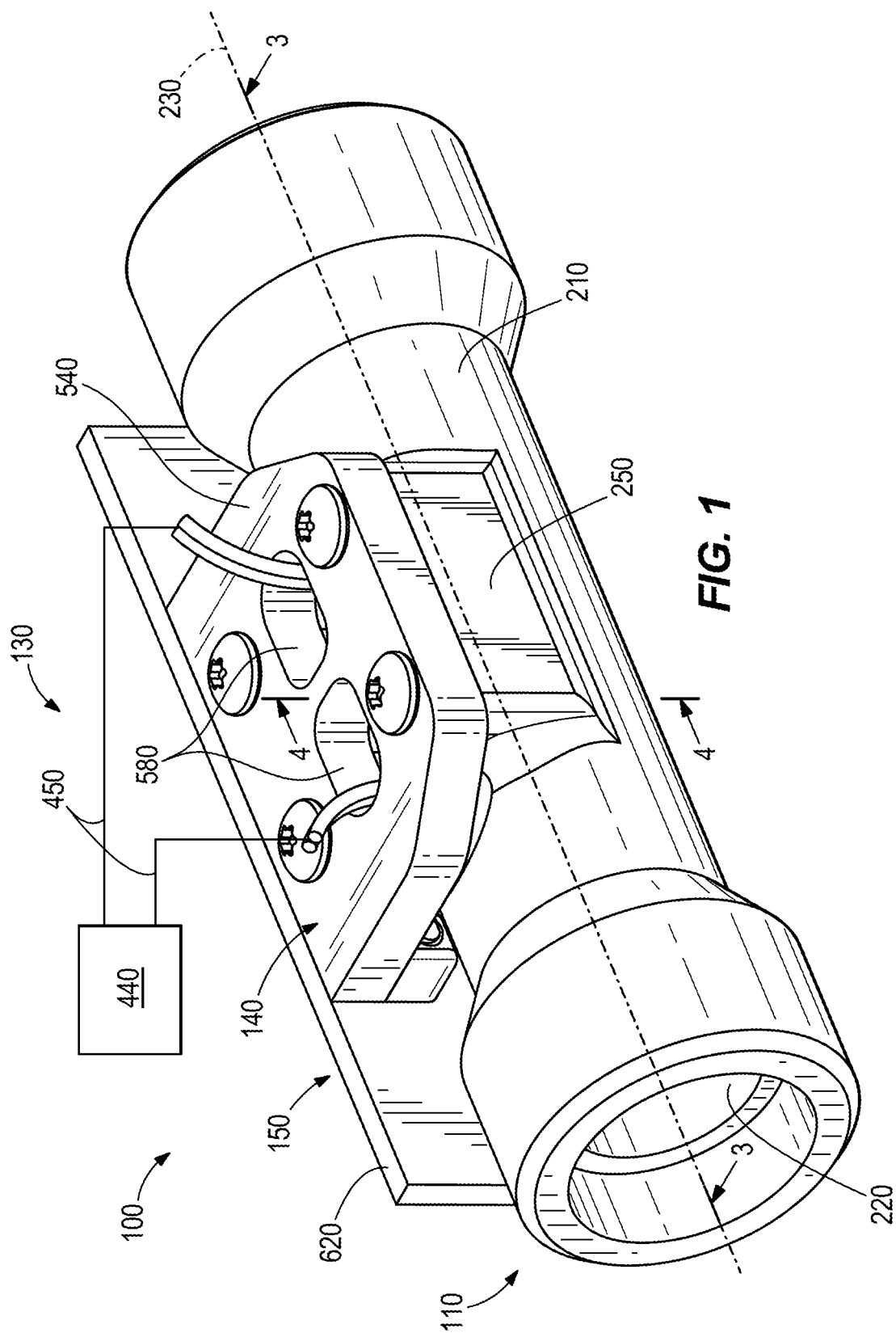
FIG. 1 is a perspective view of an embodiment of a flow sensor according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate a flow sensor assembly 100 that can be used, for example, with a water treatment unit to determine flow velocities and rates at an inlet and outlet. The flow sensor assembly 100 includes a tube 110, a base 120, hot film anemometer 130, a sealing assembly 140, and a mounting assembly 150.

With additional reference to FIGS. 5-6, the tube 110 is an elongated member having a tube wall 210 and an internal flow path 220 defining a longitudinal axis 230. For reference elements, directions, and dimensions generally perpendicular to the longitudinal axis 230 are referred to with the terms "side," "sides," and "width" and those parallel to the longitudinal axis 230 are referred to with the term "end," "ends," and "length." The tube wall 210 and flow path 220 are generally cylindrical or circular in a cross-section perpendicular to the longitudinal axis 230, such as FIG. 4.

Figure 3:
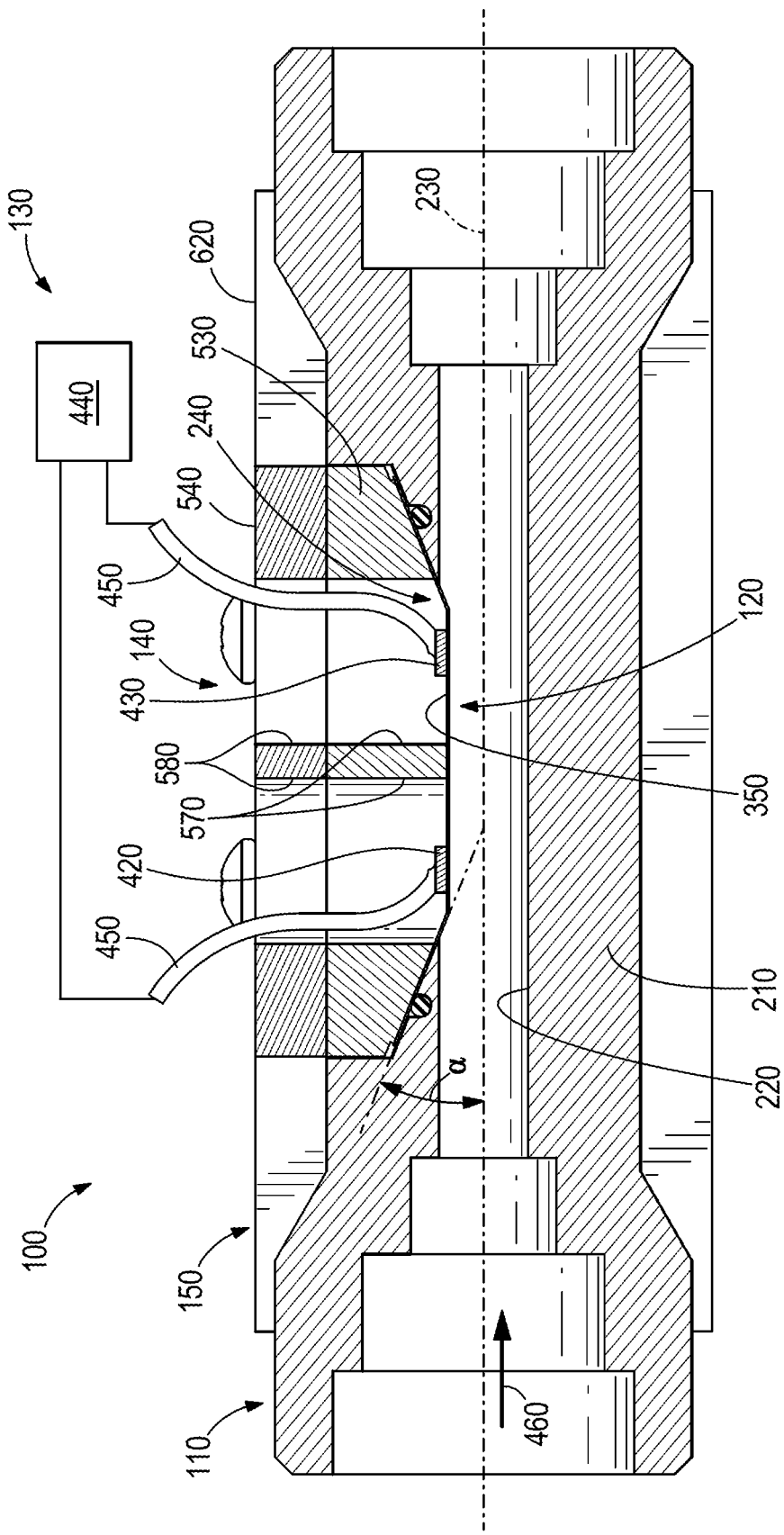
FIG. 3 is a cross-section view of the sensor taken along line 3-3 in FIG. 1.

The tube 110 includes a longitudinally-extending window 240 in the tube wall 210 and a pair of flanges 250 on opposite sides of the window 240. The window 240 includes a frame 260 recessed in the tube wall 210 and an opening 270 surrounded by the frame 260. The opening 270 communicates with the flow path 220. The frame 260 includes relatively planar, thin side portions 280 along the sides of the opening 270 and ramped end portions 290 at the opposite ends of the opening 270. The ramped end portions 290 angle upwardly from the ends of the opening 270 to the outer surface of the tube 110. As illustrated in FIG. 3, the angle α of the ramped end portions 290 with respect to the longitudinal axis 230 is about 22 degrees as illustrated, any angle in the range of 12-32 degrees should be suitable for this application. Formed into the side portions 280 and ramped end portions 290 of the frame 260 is a continuous seat 295 for use with the sealing assembly 140 as will be described in more detail below.

Figure 7:
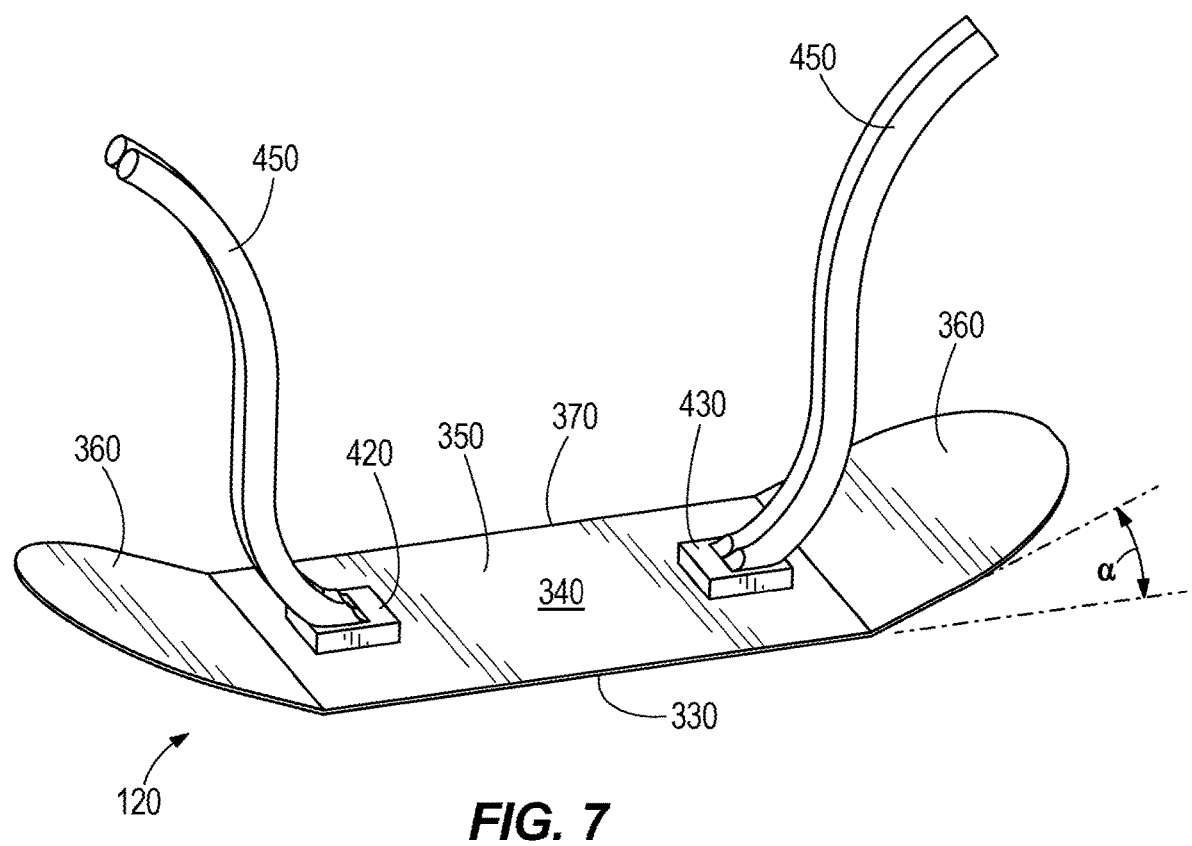
FIG. 7 is a perspective view of a base portion of the flow sensor and portions of the hot film anemometer sensor.

Referring now to FIG. 7, the base 120 is a very thin (e.g., no thicker than about 0.004 inch) piece of thermally-conductive material such as steel and is received in the window 240. The base 120 extends in the longitudinal direction. A surface of the base 120 facing toward the flow path 220 is referred to as the inwardly-facing surface 330 and the opposite surface (facing away from the flow path 220) is referred to as the outwardly-facing surface 340. The thickness of the base 120 is a reference to the distance between the inwardly-facing surface 330 and outwardly-facing surface 340. The base 120 includes a central section 350 and an angled end section 360 at each end of the central section 350. The central section 350 and the angled end sections 360 are all flat or planar, with the angled end sections 360 extend at the angle α with respect to the central section 350 (i.e., at about the same angle α of the ramped end portions 290). The inwardly-facing surface 330 and outwardly-facing surface 340 are parallel to each other in each section 350, 360.

Figure 4:
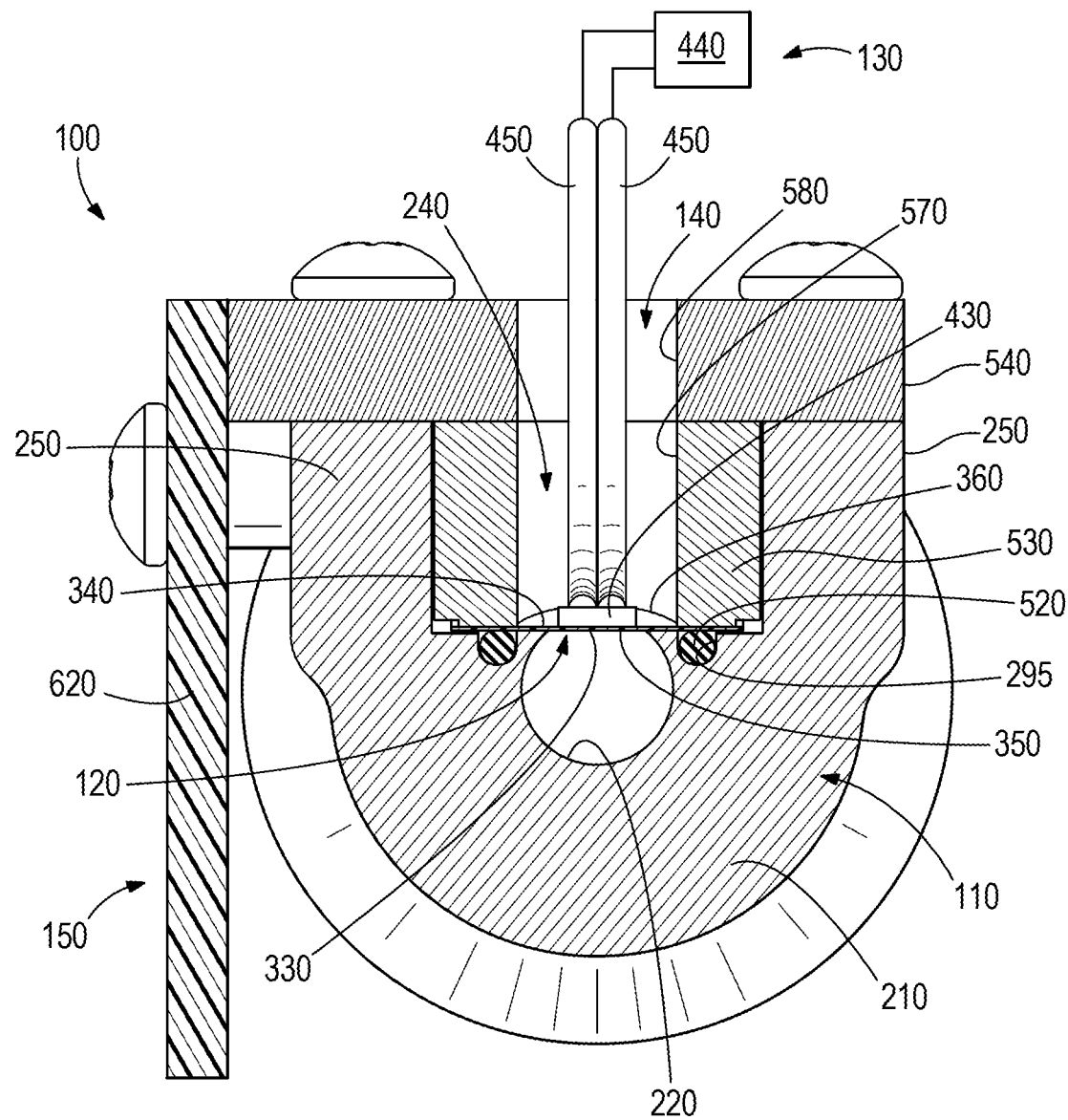
FIG. 4 is a cross-section view of the sensor taken along line 4-4 in FIG. 1.

The base 120 includes a periphery or perimeter 370 extending over the frame 260 of the window 240, with the perimeter 370 of the central section 350 being supported by the side portions 280 of the frame 260 and the perimeter 370 of the angled end sections 360 being supported by the ramped end portions 290 of the frame 260. The central section 350 of the base 120 covers the opening 270 of the window 240, with the inwardly-facing surface 330 being exposed to (i.e., in direct contact with) fluid in the flow path 220. Referring to FIG. 4, the central section 350 truncates the circular cross-section of the flow path 220 and appears as a chord in the transverse cross-section view. The central section 350 may also be referred to as the sensor-mounting section because components of the hot film anemometer 130 are mounted to it.

With reference to FIGS. 1-4 and 7, the hot film anemometer 130 includes a heater 420, a sensor 430, a controller 440, and wires 450 connecting the controller 440 to the heater 420 and sensor 430. The heater 420 and sensor 430 are secured to the central section 350 of the base 120 through thermally-conductive means such as precision soldering or brazing that minimizes or eliminates air pockets or any other thermal insulators. The heater 420 is upstream from the sensor 430 in the longitudinal direction with respect to an expected flow direction 460 (FIG. 3) of fluid in the flow path 220. The heater 420 generates a precise amount of heat, as determined by the controller 440, The heat is passed to the fluid in the flow path 220 by conduction through the central section 350 of the base 120. The sensor 430 senses the temperature of the fluid in the flow path 220 by conduction through the base 120, and provides the temperature information to the controller 440. The controller 440 calculates fluid flow velocity as a function of the heat generated by the heater 420, the heat sensed by the sensor 430, the distance between the heater 420 and the sensor 430, the thermal conductivity and thickness of the base 120, the properties of fluid in the flow path 220, and other factors. The controller 440 may also calculate the flow rate of the fluid if the dimensions of the flow path 220 are provided. Controller 440 communicates with the heater 420 and sensor 430 through wires 450 in the illustrated embodiment, but in other embodiments could use wireless communication.

Figure 2:
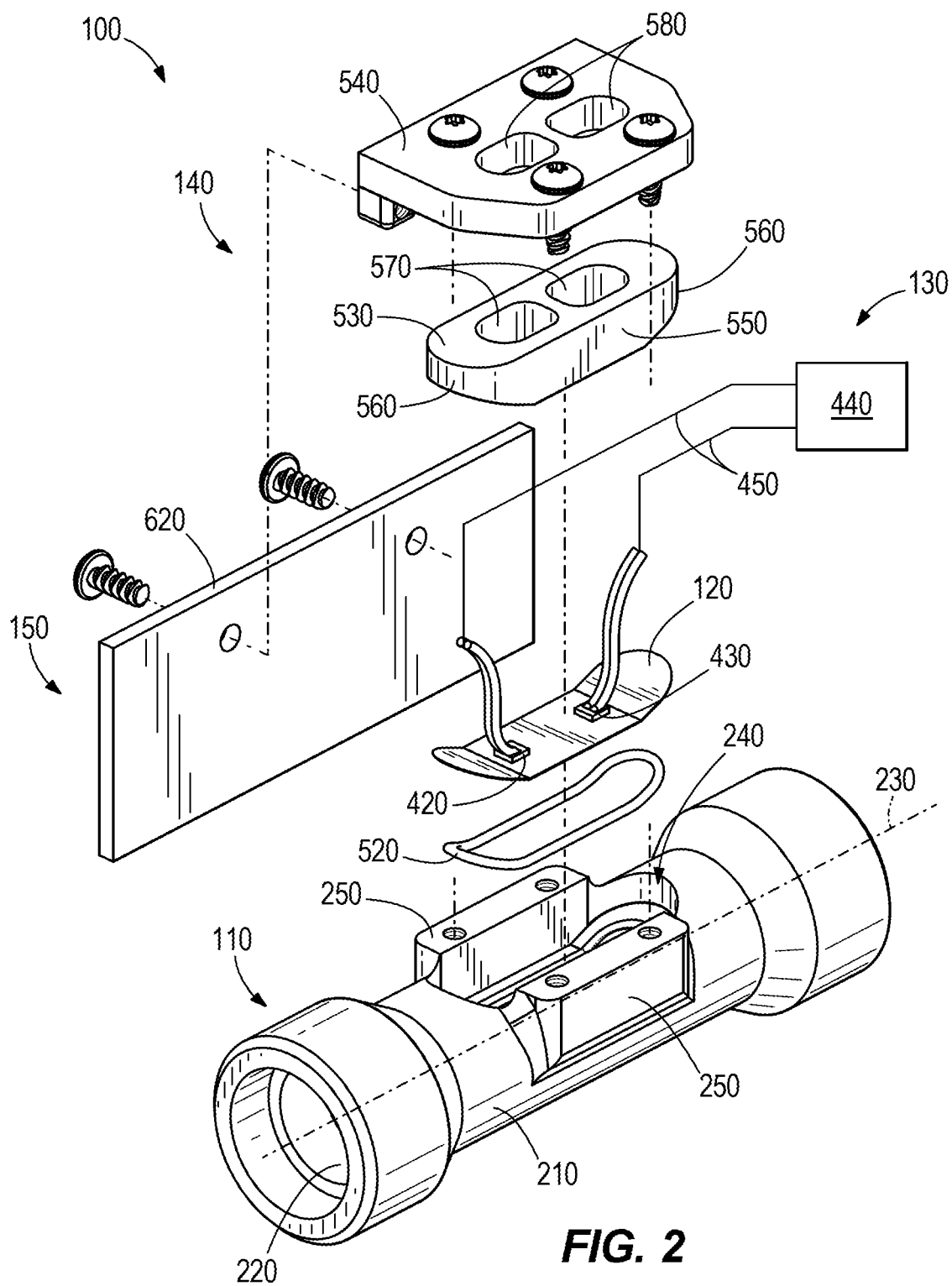
FIG. 2 is an exploded view of the flow sensor.

Referring primarily to FIG. 2, the sealing assembly 140 includes a seal 520 (e.g., a gasket, an O-ring, or other type of seal), a clamping block 530, and a clamping plate 540. The seal 520 is positioned in the seat 295 in the frame 260 and thus surrounds the opening 270. The clamping block 530 includes a central portion 550 and ramped end portions 560 that substantially follow the shape of the outwardly-facing surface 340 of the central section 350 and angled end sections 360 of the base 120. The clamping block 530 and clamping plate 540 include aligned pass-through holes 570, 580, respectively, through which the wires 450 of the hot film anemometer 130 extend.

During assembly, the base 120 is positioned in the window 240 with its perimeter 370 in contact with the seal 520 and the clamping block 530 is inserted into the window 240 on top of the base 120 with the wires 450 extending through the pass-through holes 570 in the clamping block 530. Then the clamping plate 540 is mounted with fasteners to the flanges 250 on the tube 110, with the wires 450 extending through the pass-through holes 580. The flanges 250, clamping block 530, and clamping plate 540 are sized and configured such that the clamping plate 540 contacts the top of the clamping block 530 when the clamping plate 540 is secured to the flanges 250. The clamping plate 540 applies a radially-directed (i.e., generally toward the longitudinal axis 230) clamping force to the clamping block 530, which clamps the base 120 against the frame 260. The seal 520 is sandwiched between the perimeter 370 of the base 120 and the frame 260 to create a water-tight seal between the base 120 and the tube 110. Depending on how it is configured and the requirements of the specific application, the water-tight seal may be rated up to 100 psi, 200 psi, 300 psi, or 400 psi. The water-tight seal resists leakage of fluid from the flow path 220 through the window 240.

The mounting assembly 150 may include a mounting plate 620 that is secured to a side of the clamping plate 540 with fasteners. Alternatively, the mounting plate 620 may be formed integrally with the clamping plate 540. The mounting plate 620 may be secured to a convenient mounting place in the environment in which the flow sensor assembly 100 is used.

It should be noted that the base 120 can be formed relatively easily from thin sheet material that can be formed in a relatively simple single or multiple step forming process. The window 240 can be included in the formation process of the tube 110 (e.g., injection molding). The present invention therefor provides a method of manufacturing that includes separately producing the base 120 and tube 110 with relatively simple yet reliable processes and later install the base 120 into the window 240. This is advantageous compared to machining, modifying, or otherwise post-processing a portion of a tube wall made of a thermally-conductive material to provide a sensor-mounting section that is integrally formed with the thermally-conductive tube wall. Such post-processing of the tube wall can be time-consuming, complicated, and less reliable than the present invention, especially when a very thin, planar sensor-mounting section is necessary or desirable. The present invention is also advantageous because the same base 120 and sealing assembly 140 can be used on tubes 110 of different sizes, provided that the window 240 formed in the tubes 110 is consistently sized.

Thus, the invention provides, among other things, a flow sensor mounted in a window provided in a tube wall, such that the sensor is exposed to the fluid flowing through flow path in the tube. Various features and advantages of the invention are set forth in the following claims.

What is claimed is:

1. A method for determining flow velocity in a flow path, comprising:
  defining a flow path for a fluid, the fluid flowing in a downstream direction that is opposite an upstream direction;
  exposing a thermally-conductive element to the flow path;
  applying a known amount of heat to a first portion of the thermally-conductive element;

sensing a sensed temperature of a second portion of the thermally-conductive element downstream of the first portion; and determining a flow velocity of the fluid in the flow path based on the known amount of heat and the sensed temperature.

2. The method of claim 1, wherein defining a flow path for a fluid comprises providing a tube having a tube wall surrounding the flow path and having a longitudinal axis extending in the downstream direction.

3. The method of claim 2, wherein exposing a thermally-conductive element to the flow path comprises defining a window in the tube wall and positioning the thermally-conductive element in the window with a side of the thermally-conductive element facing the flow path.

4. The method of claim 3, wherein positioning the thermally-conductive element in the window includes recessing the thermally-conductive element in the tube wall.

5. The method of claim 3, further comprising sealing the thermally-conductive element in the window to prevent fluid in the flow path from leaking out of the window.

6. The method of claim 1, wherein exposing a thermally-conductive element includes providing a piece of thermally-conductive material having a thickness no greater than 0.004 inch and exposing a first surface of the piece of thermally-conductive material to the flow path.

7. The method of claim 1, wherein:

exposing a thermally-conductive element includes providing a piece of thermally-conductive material having a first surface facing toward the fluid flowing in a downstream direction and a second surface facing away from the fluid flowing in a downstream direction;

applying a known amount of heat includes applying the known amount of heat to the second surface; and sensing a sensed temperature includes sensing a temperature of the second surface.

8. The method of claim 7, wherein sensing a sensed temperature further includes mounting a temperature sensor to a sensor-mounting section of the second surface for sensing the temperature of the second surface.

9. The method of claim 8, wherein providing a piece of thermally-conductive material includes making the first and second surfaces of the thermally-conductive element planar and parallel to each other in the sensor-mounting section.

10. The method of claim 1, wherein applying a known amount of heat and sensing a sensed temperature, and determining a flow velocity are all done under the control of the controller.

11. The method of claim 1, further comprising providing a hot film anemometer flow sensor having a heater and a temperature sensor; wherein applying a known amount of heat is performed with the heater; and sensing a sensed temperature is performed with the temperature sensor.

* * * * *